J. H. EAMES.
HOG-CATCHER.

No. 191,575.                         Patented June 5. 1877.

WITNESSES:
C. Neveux
J. H. Scarborough

INVENTOR:
J. H. Eames.
BY
ATTORNEYS.

UNITED STATES PATENT OFFICE.

JAMES H. EAMES, OF EMERSON, IOWA.

IMPROVEMENT IN HOG-CATCHERS.

Specification forming part of Letters Patent No. 191,575, dated June 5, 1877; application filed April 30, 1877.

*To all whom it may concern:*

Figure 1:
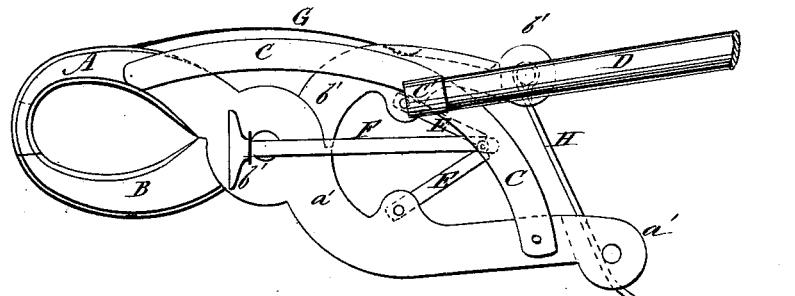
Figure 2:
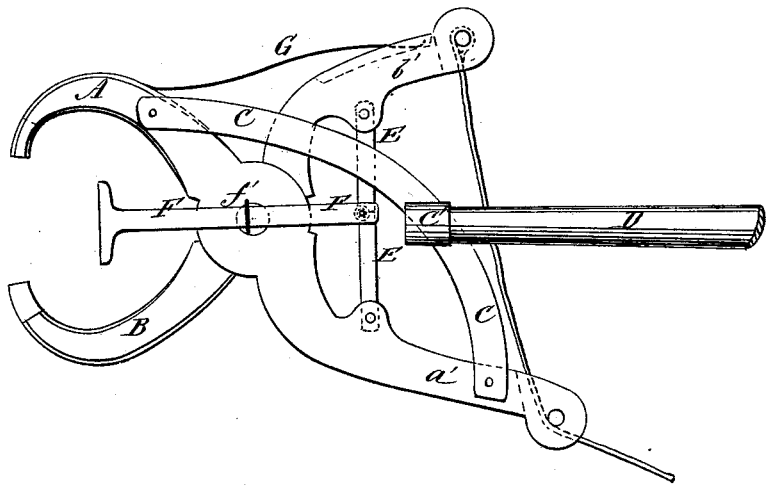
Figure 3:
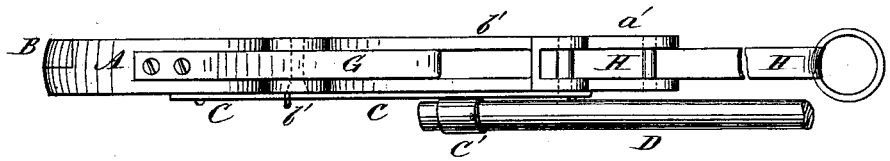

Be it known that I, JAMES HUTCHINS EAMES, of Emerson, in the county of Mills and State of Iowa, have invented a new and useful Improvement in Hog-Catchers, of which the following is a specification:

Figure 1 is a side view of my improved device closed. Fig. 2 is a side view of the same open or set. Fig. 3 is an edge view of the same.

Similar letters of reference indicate corresponding parts.

The object of this invention is to furnish an improved device for catching hogs, sheep, calves, and other small animals, and poultry, which shall be simple in construction, convenient in use, and effective in operation, holding the animal securely.

The invention consists in the combination of the pivoted curved jaws, provided with shanks of different lengths, the curved bar, provided with a socket to receive the handle, the jointed bar, the sliding cross or T head trip-bar, the spring, and the cord or strap, with each other, as hereinafter fully described.

A and B are the jaws, which are curved inward or toward each other, and the ends of which overlap each other. The jaws A B cross, and are pivoted to each other, and are widened at their point of crossing to give them a wide bearing, to keep them from turning or getting out of line with each other.

The shanks $a'$ $b'$ of the jaws A B are made of different lengths, and to the longer shank $a'$ and its jaw A are attached the ends of a curved bar, C, to which is attached a socket, $c'$, to receive the handle D. The handle D, for ordinary purposes, should be about ten feet long.

To the shanks $a'$ $b'$ are pivoted the ends of a bar, E, which is made in two parts, connected to each other by a rule-joint.

To the pivot of the joint of the bar E is attached the end of a trip-bar, F, which passes forward through a staple or keeper, $f'$, attached to one of the jaws, as A, near its pivot, and which may be covered and protected by a cap formed upon or attached to said jaw. The trip-bar F has a cross or T head formed upon its forward end, as shown in Figs. 1 and 2.

G is a spring, the forward end of which is attached to the outer side of the stationary jaw A, and its rear end rests and slides in a groove in the outer side of the shank $b'$ of the movable jaw B.

To the end of the shank $b'$ of the movable jaw B is attached the end of a strap or cord, H, which passes around a guide pin or pulley attached or pivoted to the end of the shank $a'$ of the stationary jaw A. The cord or strap H should be of about the same length as the handle D.

In using the device, the jointed bar E and the cross or T head trip-bar F are pushed forward to bring the parts of the bar E into a straight line, where they lock themselves, and to cause the cross or T head of the bar F to project, as shown in Fig. 2. The operator then takes hold of the handle D and the cord or strap H, and passes the jaws A B around the animal's leg from behind.

As the cross or T head of the trip-bar F strikes the leg it is pushed back, pushing back the jointed bar E, and the spring G at once closes the jaws A B around the said leg. The handle D is then withdrawn from the socket $c'$, and the animal is held by means of the cord or strap H, and any effort the animal may make to escape only draws upon the cord or strap H, and causes the jaws A B to be held together more firmly.

The device may be made of various sizes and strength, according to the size of the animals to be caught.

Having thus described my invention, I claim as new and desire to secure by Letters Patent—

The combination of the pivoted curved jaws A B, provided with shanks $a'$ $b'$, of different lengths, the curved bar C, provided with a socket, $c'$, to receive the handle D, the jointed bar E, the sliding cross or T head trip-bar F, the spring G, and the cord or strap H, with each other, substantially as herein shown and described.

JAMES HUTCHINS EAMES.

Witnesses:
    A. A. WHIPPLE,
    M. W. BENSON.